THOMAS B. JEFFERY.

Pneumatic Motors.

No. 121,626.  Patented Dec. 5, 1871.

Witnesses  
J. C. Caldwell  
H. H. Caldwell

Inventor  
Thos. B. Jeffery

UNITED STATES PATENT OFFICE.

THOMAS B. JEFFERY, OF CHICAGO, ILLINOIS, ASSIGNOR TO HORACE WICKHAM, JR., OF SAME PLACE.

IMPROVEMENT IN PNEUMATIC MOTORS.

Specification forming part of Letters Patent No. 121,626, dated December 5, 1871.

*To all whom it may concern:*

Be it known that I, THOMAS B. JEFFERY, of Chicago, county of Cook and State of Illinois, have invented certain Improvements in Pneumatic Motors, of which the following is a specification:

The first part of my invention relates to an improved mode of obtaining power and motion from the ordinary atmospheric pressure in combination with a suitable vacuum. The object of this part of my invention is to produce a desirable motor for sewing, knitting, and any other machine where such a motor can be used, including churns, &c. The second part of my invention relates to the combination of pulleys, gear-wheels, and other suitable and necessary devices for transmitting, governing, and creating power and motion.

Figure 1:
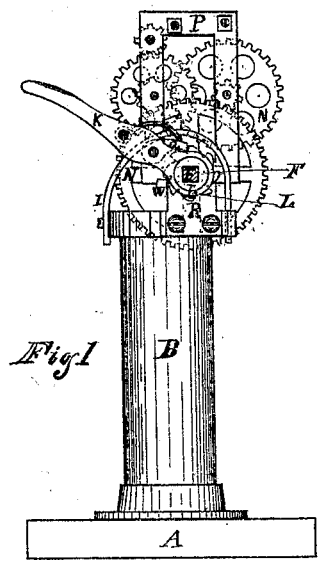
Figure 2:
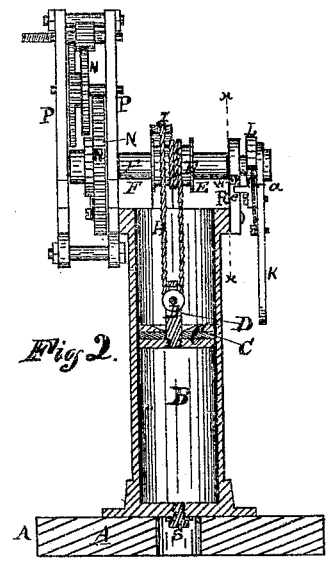
Figure 3:
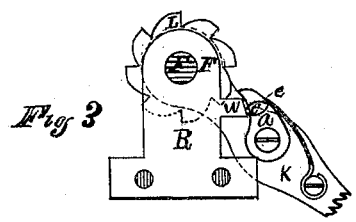

Figure 1 is a side view of the machine. Fig. 2 is a cross-section of Fig. 1. Fig. 3 is an enlarged view of the parts to the right of the dotted line $x\ x$, Fig. 2.

A is the platform, to which the machine is secured. B is the cylinder, wherein a suitable vacuum is produced by raising the plunger or piston C. D is a pulley connected to the plunger or piston C, to be connected in an adjustable or stationary manner. E is a drum on the main shaft F, on which the rope H is coiled. One end of the rope H is secured to the brace I, then passed through the pulley D and connected to the drum E, on which it is coiled by means of the lever K, (or a crank,) ratchet L, and dog $a$. N N is a train of one or more gear-wheels for transmitting the power and motion, with a fan attached to govern the machine, to be attached at any suitable point. Any other known governor or brake is to be used instead. P P is the frame containing the train of wheels N N. R is a support to one end of the shaft F. Support R has a projection, W, which throws the dog $a$ out of gear. Set-screw S lets air in and out of the cylinder, or a stop-cock to be placed at the bottom outside of the cylinder or valves in the plunger or piston, as desired.

The power and motion is to be transmitted substantially in the following manner: The rope H is coiled around the drum E by means of the lever K, ratchet L, and dog $a$, or any other known way. The coiling of the rope H around the drum E raises the plunger or piston C, which leaves the required vacuum in the cylinder B after the plunger or piston has been raised and the dog $a$ is out of gear and the brake is off. The ordinary atmosphere, pressing on the outer face of the plunger or piston, causes the plunger or piston to descend, at the same time causing the rope H to uncoil from and revolve the shaft F and the gear-wheel N thereon, said gear-wheel N revolving the next shaft and wheel, &c.

Rubber or any other known suitable packing is to be used for packing the plunger or piston.

I claim as my invention—

A cylinder and plunger or piston, the latter operated so that a vacuum produced beneath it by its elevation shall afford a continuous motive power when combined with a system of gearing, substantially as specified.

THOS. B. JEFFERY.

Witnesses:
WESLEY WICKHAM,
JAMES CHALMERS.

(118)